(12) United States Patent
Kolodziej

(10) Patent No.: US 7,348,082 B2
(45) Date of Patent: Mar. 25, 2008

(54) RECURSIVE KALMAN FILTER FOR FEEDBACK FLOW CONTROL IN PEM FUEL CELL

(75) Inventor: Jason R Kolodziej, West Henrietta, NY (US)

(73) Assignee: General Motors Corporation, Detroit, MI (US)

( * ) Notice: Subject to any disclaimer, the term of this patent is extended or adjusted under 35 U.S.C. 154(b) by 621 days.

(21) Appl. No.: 10/772,604

(22) Filed: Feb. 5, 2004

(65) Prior Publication Data
US 2005/0175871 A1    Aug. 11, 2005

(51) Int. Cl.
*H01M 8/00* (2006.01)
(52) U.S. Cl. ............. 429/13; 429/22; 429/23
(58) Field of Classification Search ........... 429/13, 429/21, 22, 23, 24, 25; 700/291, 301, 266, 700/282, 286; 73/115, 199, 1.59, 1.16
See application file for complete search history.

(56) References Cited
U.S. PATENT DOCUMENTS
2002/0161550 A1* 10/2002 Bharadwaj et al. ......... 702/182
2005/0057255 A1* 3/2005 Tate et al. .................. 324/426

FOREIGN PATENT DOCUMENTS
EP    0516534    *   2/1992

OTHER PUBLICATIONS

Incropera, Frank P. and Dewitt, David P., "Fundamentals Of Heat And Mass Transfer, Fourth Edition", John Wiley & Sons, p. 420-424, 1996.
Ljung, Lennart, "System Identification Theory For The User, Second Edition", Prentice-Hall, 1999, p. 97-99.

* cited by examiner

*Primary Examiner*—Raymond Alejandro

(57) ABSTRACT

A method and apparatus of operating a compressor of a fuel cell system includes modeling a flow meter that measures a mass flow from a compressor with a first mathematical formula and generating a measured signal from the flow meter. The first mathematical formula and the measured signal are processed through a recursive Kalman filter based signal processing algorithm to provide a future signal estimate. The compressor is operated based on the future signal estimate.

12 Claims, 7 Drawing Sheets

RECURSIVE KALMAN FILTER FOR FEEDBACK FLOW CONTROL IN PEM FUEL CELL

FIELD OF THE INVENTION

The present invention relates to fuel cells, and more particularly to flow control in a fuel cell system.

BACKGROUND OF THE INVENTION

Fuel cell systems include a fuel cell stack that produces electrical energy based on a reaction between a hydrogen-based feed gas (e.g., pure hydrogen or a hydrogen reformate) and an oxidant feed gas (e.g., pure oxygen or oxygen-containing air). The hydrogen-based feed gas and oxidant feed gas are supplied to the fuel cell stack at appropriate operating conditions (i.e., temperature and pressure) for reacting therein. The proper conditioning of the feed gases is achieved by other components of the fuel cell stack to provide the proper operating conditions.

The fuel cell system includes a compressor for compressing the oxidant feed gas to an appropriate operating pressure for reaction in the fuel cell stack. The compressor also supplies the oxidant feed gas to the fuel cell stack at a flow rate, which is dependent on the electrical load demand from the fuel cell stack. For example, when electrical load demand is increased, the compressor supplies the oxidant feed gas to the fuel cell stack at a higher flow rate.

A mass flow meter is used as a feedback sensor for compressor mass flow control. The flow sensor monitors the mass flow rate of oxidant feed gas through a pipe to the fuel cell stack. Typical mass flow meters are of a hot-wire type that are effected by the flow therethrough. Laminar flow through the pipe results in a steady, accurate signal from the mass flow meter. Turbulent flow, however, results in highly-varying, inaccurate signals. As a result, up to ten pipe diameters of straight pipe length is required before and after the mass flow meter to ensure laminar flow through the mass flow meter. In most applications, however, there is insufficient space to include such long sections of pipe.

One conventional solution includes processing the flow sensor signal through a low pass filter. In this manner, the mass flow meter signal is smoothed, eliminating some of the erroneous data. This, however, still results in an inaccurate mass flow meter signal. Another conventional solution includes incorporating flow straighteners, such as honeycomb flow straighteners, within the pipe. As a result the component count is increased making the overall system more complex and expensive.

SUMMARY OF THE INVENTION

Accordingly, the present invention provides a method of operating a compressor of a fuel cell system. The method includes modeling a flow meter that measures a mass flow from a compressor with a first mathematical formula, generating a measured signal from the flow meter. The first mathematical formula and the measured signal are processed through a KF-based signal processing algorithm to provide a future signal estimate. The compressor is operated based on the future signal estimate.

In one feature, the first mathematical formula consists of a $3^{rd}$ order model of the cathode system.

In another feature, the method further includes predicting a current signal estimate based on a previously smoothed signal estimate. The previously smoothed signal estimate is determined based on a previously predicted estimate, a previous signal measurement and a previous gain.

In yet another feature, the method further provides calculating a smoothed current signal estimate based on a predicted current estimate, a current measurement and a gain. The future signal estimate is based on the smoothed current signal estimate. The future signal estimate is further based on a current command signal. The method further includes modeling a compressor command signal with a second mathematical formula and calculating the current command signal based on the second mathematical formula.

The present invention also include a fuel cell signal which is adapted to employ the above described methods for operating a compressor of a fuel cell.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
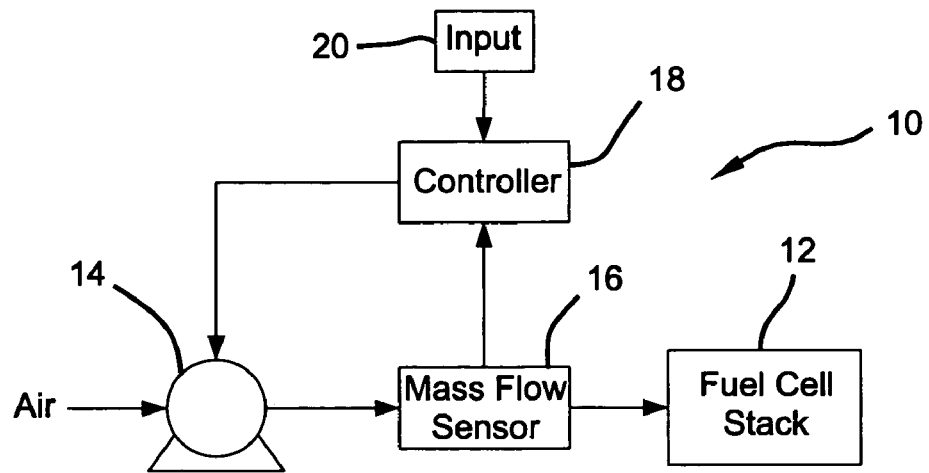
FIG. 1 is a schematic illustration of a cathode loop of a fuel cell system.

Referring now to FIG. 1, a cathode loop of a fuel cell system 10 is schematically illustrated. The fuel cell system 10 includes a fuel cell stack 12 that processes hydrogen and oxygen to produce electrical energy. More specifically, as hydrogen-containing feed gas flows into an anode side of the fuel cell stack 12. A catalyst facilitates separation of the hydrogen-containing feed gas into electrons and hydrogen ions (i.e., protons). The hydrogen ions pass through an electrolyte membrane and combine with oxygen in a cathode side to produce water ($H_2O$). The electrons, which cannot pass through the electrolyte membrane, flow from the anode side to the cathode side through an external circuit (e.g., the load). The load consumes the power generated by the fuel cell stack 12.

Figure 2A:
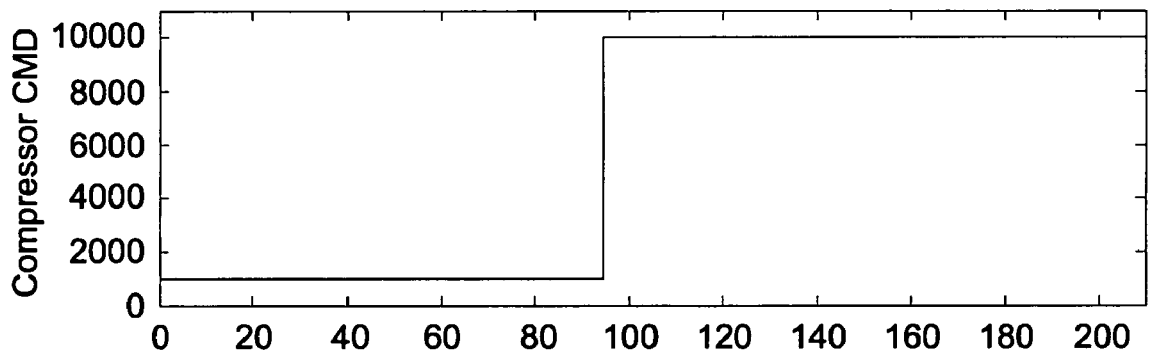
FIGS. 2A and 2B are a set of graphs illustrating a compressor command signal generated by a controller of the fuel cell system and an air mass flow signal generated by a mass flow sensor of the fuel cell system.
Figure 2B:
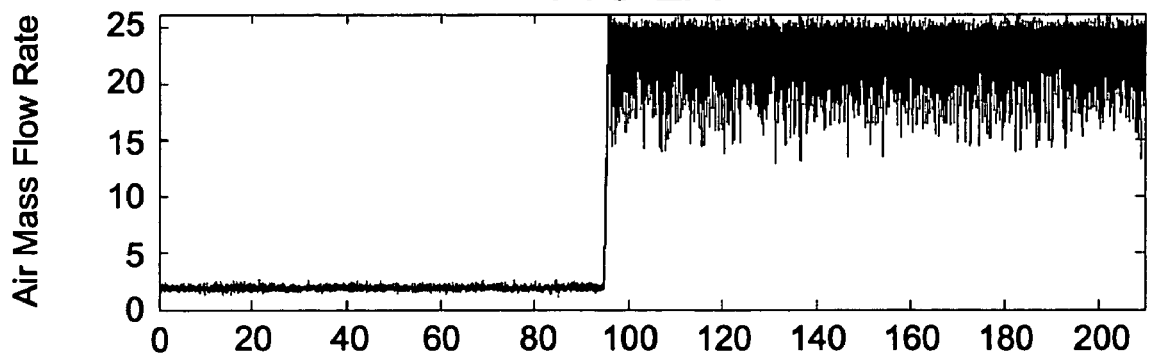

A control element such as compressor 14 provides a feed stream such as oxygen-containing air for processing in the fuel cell stack 12. A mass flow sensor 16 measures the mass flow of air to the fuel cell stack 12. A controller 18 controls operation of the fuel cell system 10 based on control algorithms and an input 20. The input 20 generates a control signal based on a desired power output from the fuel cell system 10. For example, in the case of a vehicle, the input 20 is a throttle position signal and the control signal indicates a desired vehicle speed. The controller 18 operates the fuel cell system 10 to obtain the desired power output from the fuel cell stack 12 for achieving the desired vehicle speed. The controller 18 controls the compressor 14 based on the feedback signal generated by the mass flow sensor 16. As described herein, the present invention is used to operate and control a compressor in the catalyst feed stream. However, one skilled in the art will recognize that the present invention could have utility for operating or regulation of other control alerts or measurements within the fuel cell system A set of graphs respectively illustrate an exemplary compressor command signal generated by the controller 18 in FIG. 2A and an exemplary mass flow signal generated by the mass flow sensor 16 in FIG. 2B. Initially, the compressor command signal is approximately 1,000 RPM. This corresponds to approximately 2 grams per second (gps) mass flow of air to the fuel cell stack 12. At such a low mass flow rate, the air flow is laminar generating only slight noise in the sensor signal. After approximately 90 seconds of operating time, the controller 18 increases the compressor command signal to approximately 10,000 RPM in step-wise fashion, corresponding to approximately 23 gps mass flow of air to the fuel cell stack 12. Such an increase can occur based on a desired power output increase from the fuel cell stack 12. The increased mass flow rate results in turbulent air flow which generates significant noise in the sensor signal.

For example, at the lower air mass flow rate of about 2 gps the noise corruption is much smaller, with a variance of about 0.0115, as compared to the higher air mass flow rate of about 23 gps, with a variance of about 3.636. Thus, the corruption of the measurement signal at higher air mass flow rates can be significant.

The present invention provides a Kalman Filter (KF)-based signal processor. A standard KF combines the concept of recursive least squares estimation with a state space model and noise model to optimally estimate the signal value. The KF estimates the signal value based on a linear model of the sensor signal. The linear model of the sensor signal includes a linear dynamic model, a description of the covariance of the errors in the signal dynamics, and a description of the covariance of the errors in sensor measurements. The linear model is expressed in state space form as:

$$x_{k+1} = A_k x_k + B_k u_k \text{ (Process Model); and}$$

$$y_k = C_k x_k \text{ (Measurement Model)}$$

where:
  $x_k$ is the state vector (i.e. what is to be estimated);
  $y_k$ is the measurement vector (known); and
  $A_k$, $B_k$, and $C_k$ are the system matrices (known).

The KF estimates the sensor signal by using a form of feedback control. In short, the KF estimates the sensor signal at some time and then obtains feedback in the form of noisy measurements. The KF equations fall into two groups: time update equations (predictor) and measurement equations (corrector). The time update equations project the current sensor signal and error covariance estimates to obtain estimates for the next time step. The measurement update equations incorporate new measurements into the estimates to obtain an improved or updated estimate.

The KF-based signal processor of the present invention introduces a mechanism that propagates a mass air flow estimate (x) based on a $3^{rd}$ order model. The estimator propagates the estimate error covariance based on the model and how noise affects signal generation. The controller 18 processes the KF-based signal processor and controls other components of the system 10 in response to the smoothed signal.

An output-error model is used to develop an estimated airflow model and an estimated compressor command model. The output-error model is able to handle heavily corrupted measurements while maintaining a standard transfer function form. Although the output-error model is implemented in the described embodiment, it is appreciated that other linear modeling techniques can be used. The output-error model is an approximation of the sensor dynamics.

Figure 3A:
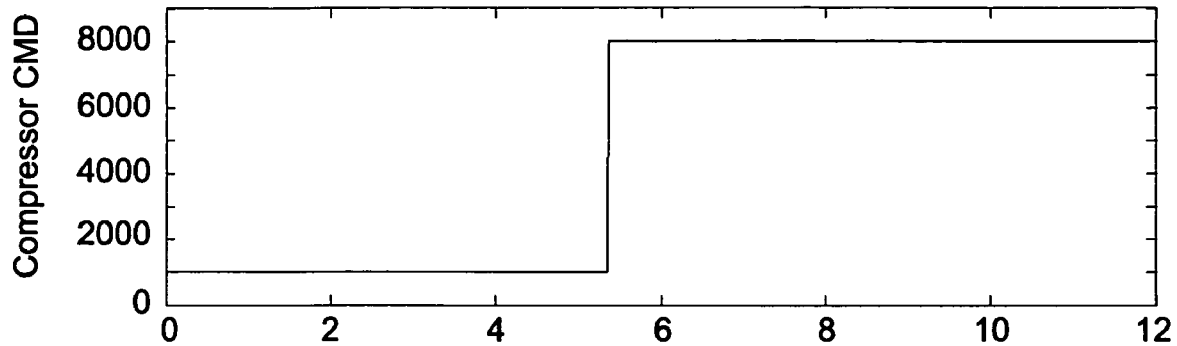
FIGS. 3A-3C are a set of graphs illustrating the compressor command signal and mass flow data points including a model overlay.
Figure 3B:
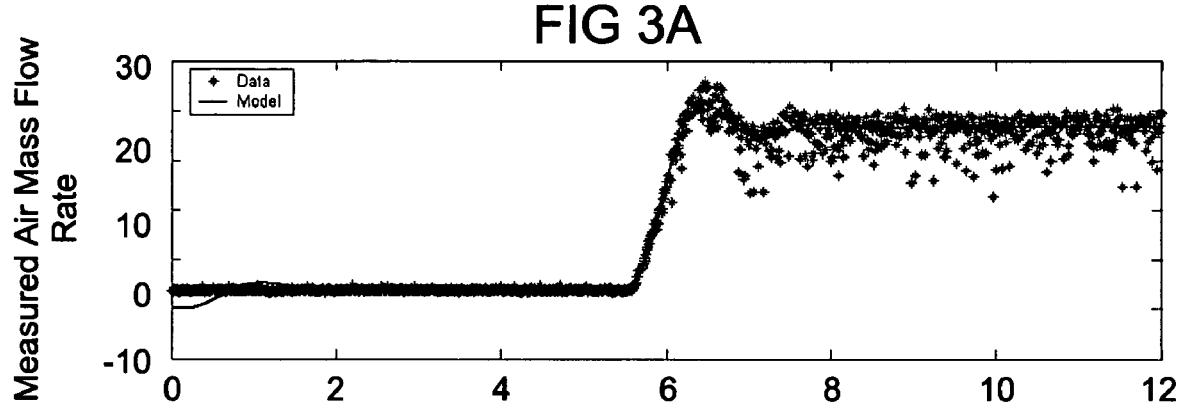
Figure 3C:
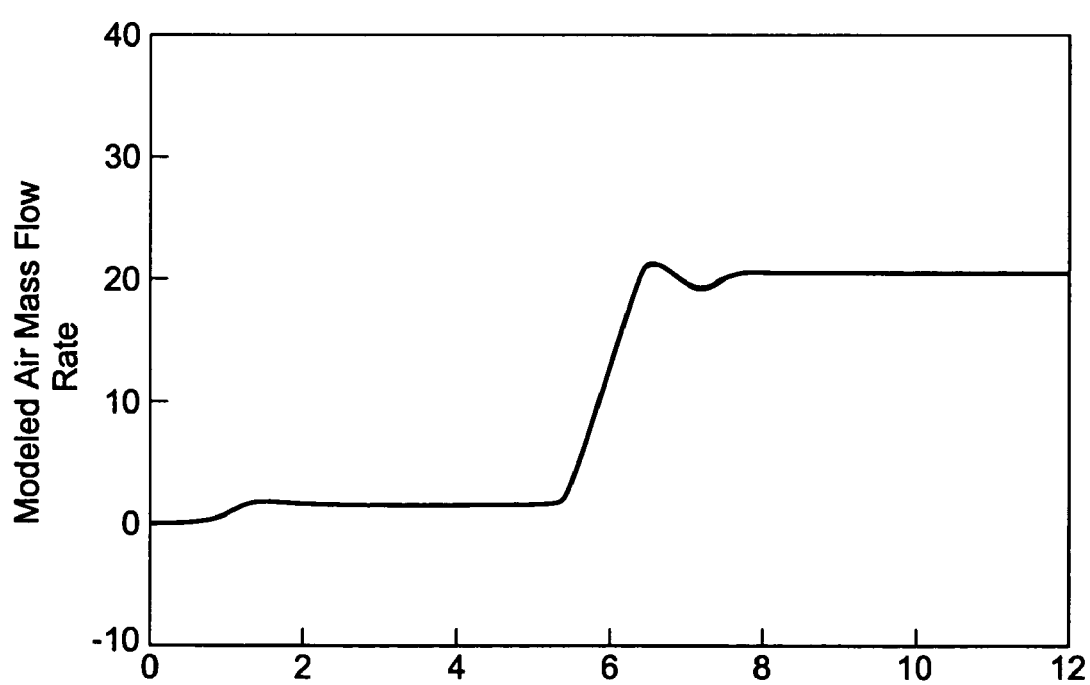

Referring now to FIGS. 3A-3C, open-loop response data is collected from the compressor mass flow sensor system. More particularly, a compressor command signal is generated and mass flow rate data points are collected from the mass flow sensor. The compressor command signal includes a single step increase. The exemplary compressor command signal of FIG. 3A includes an increase from approximately 1000 RPM to approximately 8000 RPM. The measured air mass flow rate from mass flow sensor 16 is illustrated in FIG. 3B. A model is generated based on a $3^{rd}$ order curve-fit of the air mass flow rate data points and illustrated in FIG. 3C. The air mass flow rate signal is modeled by the following equation:

$$\text{AirFlow} = \hat{x} = Q_1 z^2 - Q_2 z + Q_3$$

The compressor command signal is modeled by the following equation:

$$\text{CompressorCommand} = u = z^3 - R_1 z^2 + R_2 z - R_3$$

The coefficients of the air flow signal model and the compressor command signal, Q and R, respectively, may slightly vary based on the particularities of the compressor 14 and the mass flow rate sensor 16. The coefficients of the exemplary embodiment include:

$Q_1 = 2.40197810e-6$ $Q_2 = 5.97555508e-6$ $Q_3 = 3.73093133e-6$ $R_1 = 2.93515064$ $R_2 = 2.87339029$ $R_3 = 093817087$

The matrices that govern the KF-based signal processing of the present invention are provided in state-space form as follows:

$$\dot{x} = Ax + Bu$$

-continued $$\hat{x} = Cx$$

$$A = \begin{bmatrix} R_1 & R_2 & R_3 \\ 1 & 0 & 0 \\ 0 & 1 & 0 \end{bmatrix}$$

$$B = [1 \ 0 \ 0]^T$$

$$C = [Q_1 \ Q_2 \ Q_3]$$

The KF-based signal processing takes a previous (t=k−1) smoothed estimate ($\hat{x}_{k-1}^+$) and calculates a predicted current estimate ($\hat{x}_k^-$) at the current time (t=k). A new measurement sample ($\tilde{y}$) is used to create a smoothed current estimate ($\hat{x}_k^+$). The smoothed current estimate ($\hat{x}_k^+$) is used to predict a future estimate ($\hat{x}_{k+1}^-$) (t=k+1). The amount of smoothing is determined by the Kalman gain (K), which is directly calculated by the measurement noise variance and the estimate covariance (P). In general, if the measurement device (e.g., mass flow sensor 16) is known to be noisy, the smoothing effect will match the model result ($\hat{x}^-$) more closely. However, if the measurement device is not known to be noisy, the estimate will match the measurement ($\tilde{y}$) more closely.

The Kalman gain is defined according to the following equation:

$$K_k = P_{xx}^- H^T (P_{vv} + H P_{xx}^- H^T)^{-1}$$

where: $P_{vv}$ is the noise covariance matrix and is R=1 for this system; and H is the measurement matrix The smoothed current estimate ($\hat{x}_k^+$) is calculated according to the following equation:

$$\hat{x}_k^+ = \hat{x}_k^- + K_k(\tilde{y}_k - H\hat{x}_k^-)$$

The updated estimate covariance is defined according to the following equation:

$$P_{xx}^+ = (I - K_k H) P_{xx}^-$$

The update of the signal based on the model ($\hat{x}_{k+1}^-$) is calculated according to the state-space equations provided above, as:

$$\hat{x}_{k+1}^- = A\hat{x}_k^+ + Bu_k$$

The covariance estimate is defined according to the following equation:

$$P_{xx}^- = A P_{xx}^+ A^T + B Q B^T$$

The initial conditions are provided as:

$$P_{xx}^- = B Q B^T$$

$$\hat{x}_{t=0}^- = 0$$

It should further be noted that the A-matrix and B-matrix are defined as previously discussed and the Q-matrix is the process noise covariance, which is set equal to $10^6$ for the present embodiment. The Q-matrix represents dynamics not included in the model, which result in how well the estimate matches the data. Finally, ($^T$) denotes a matrix transpose and ($^{-1}$) a matrix inverse.

Figure 4:
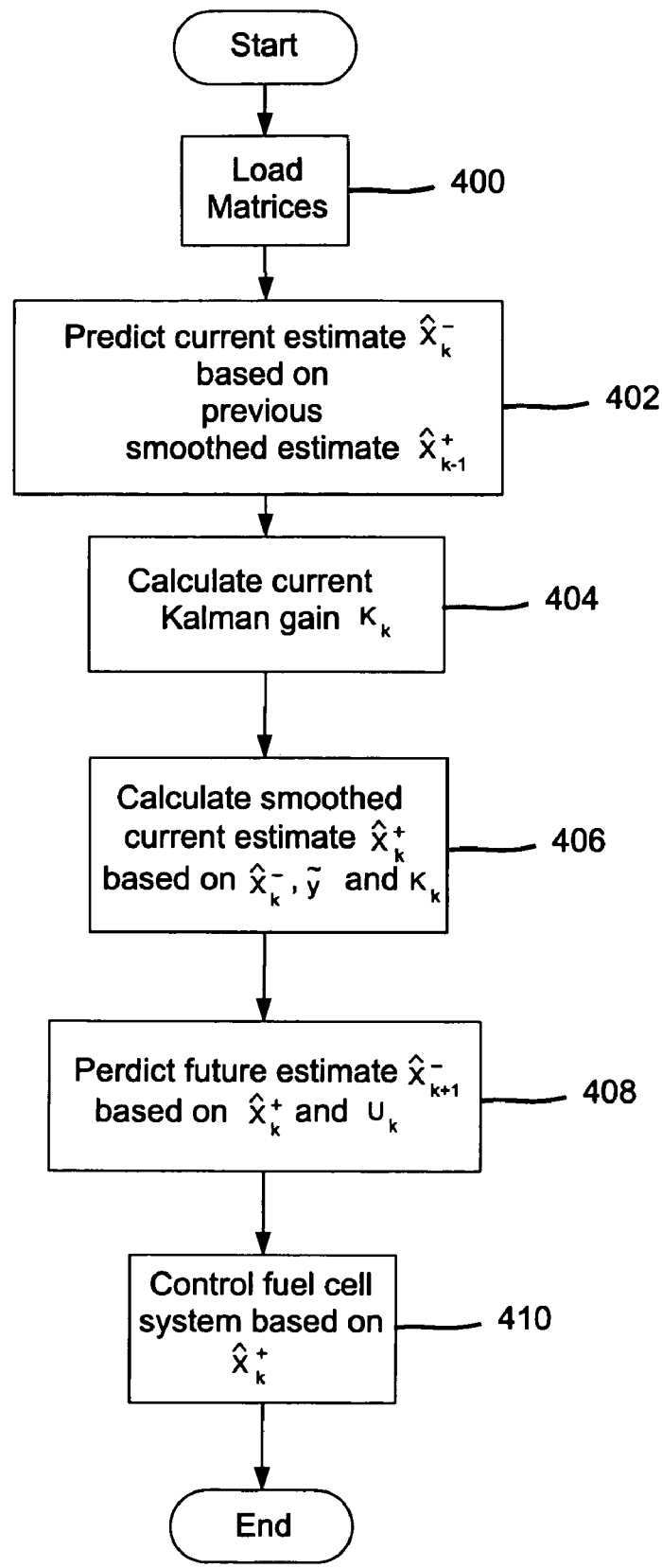
FIG. 4 is a flowchart illustrating the Kalman Filter (KF)-based mass flow signal processing according to the present invention.

Referring now to FIG. 4, the steps of the KF-based signal filtering are illustrated. Initially, the matrices are loaded and the initial conditions are set in step 400. In step 402, the current estimate ($\hat{x}_k^-$) is predicted based on the previous smoothed estimate ($\hat{x}_{k-1}^+$). The current Kalman gain ($K_k$) is calculated in step 404. In step 406, the smoothed current estimate ($\hat{x}_k^+$) is calculated based on the predicted current estimate ($\hat{x}_k^-$), the current measurement ($\tilde{y}$) and the Kalman gain ($K_k$). The future estimate ($\hat{x}_{k+1}^-$) (i.e., estimate for the next time iteration) is calculated based on the smoothed current estimate ($\hat{x}_k^+$) and the current command ($u_k$) in step 408. In step 410, the controller 18 controls the fuel cell system 10 based on the smoothed current estimate ($\hat{x}_k^+$).

Figure 5A:
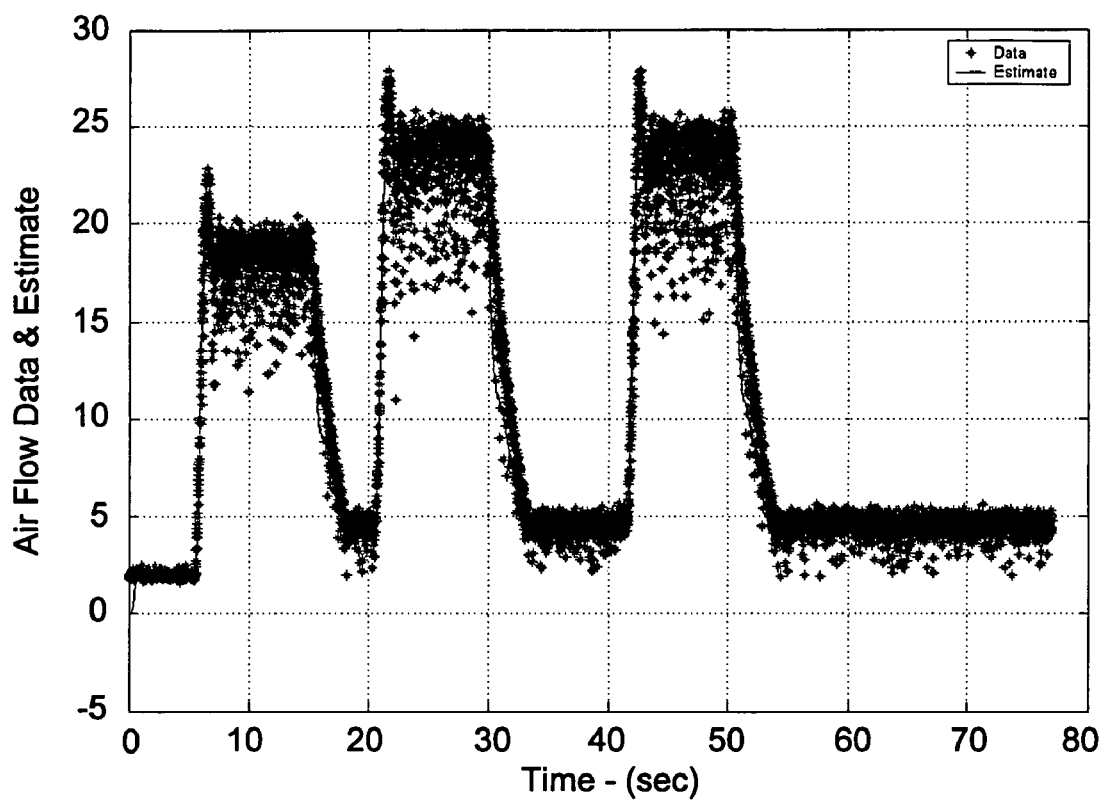
FIGS. 5A and 5B are a set of graphs illustrating the performance of a recursive Kalman filter in accordance with the present invention.
Figure 5B:
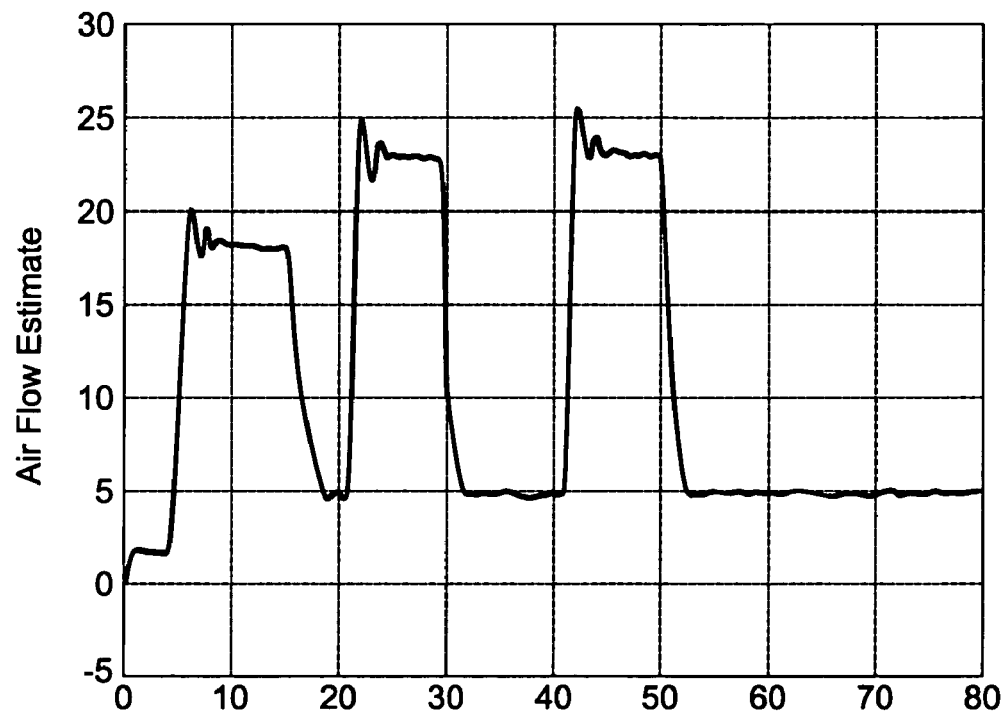

Referring now to FIGS. 5A-7C, a series of graphs illustrate and compare the accuracy of the KF-based signal processing of the present invention. More particularly, FIGS. 5A and 5B illustrate the performance of a recursive Kalman filter derived according to the measurements of FIG. 2 with data points illustrated in FIG. 5A compared to the filter estimate illustrated in FIG. 5B. Such a comparison shows off-line simulation results of the recursive Kalman filter. The up-transient that begins at time T=42 seconds is the step response used to perform system identification. It should be appreciated from these figures, the filter does an excellent job filtering the heavily corrupted measurement signal even at high flow rates.

Figure 6A:
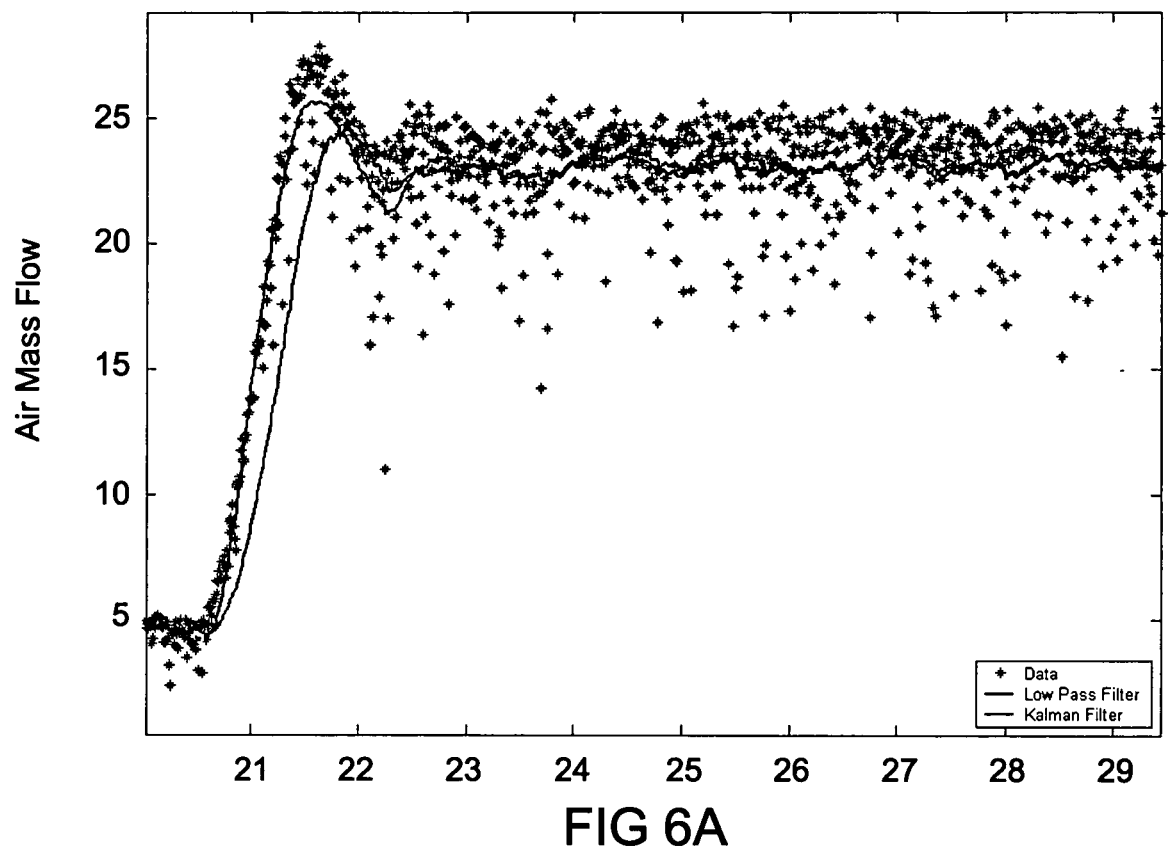
FIGS. 6A and 6B are a set of graphs comparing the KF-based mass flow signal processing and a traditional low pass mass flow signal processing.
Figure 6B:
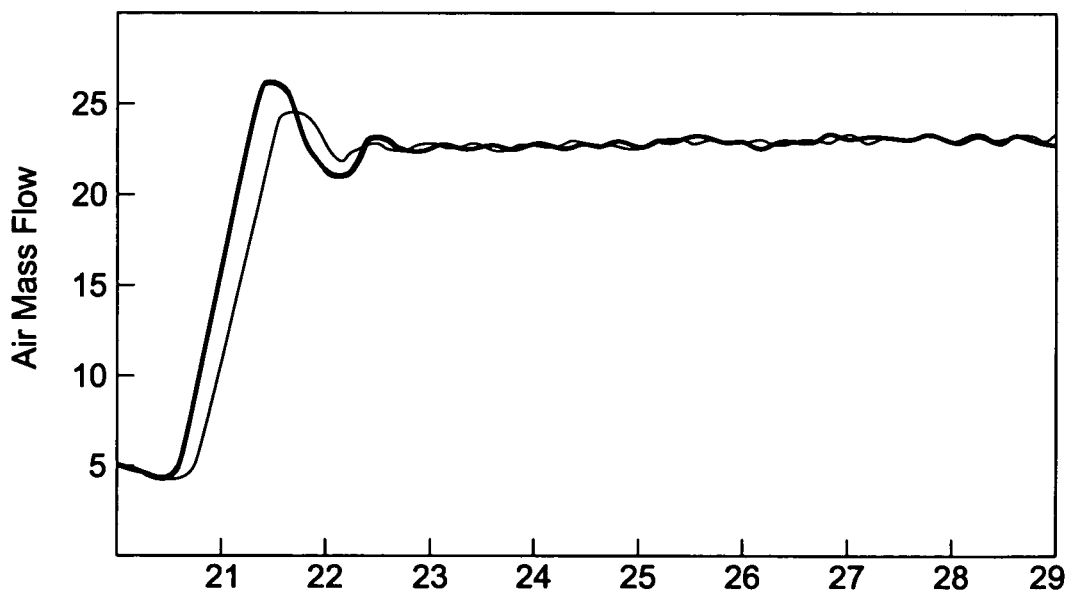

FIGS. 6A and 6B show simulated, comparative performance between the recursive Kalman filter derived according to the measurements of FIG. 2 and a low-pass first order lag filter derived according to the measurements of FIG. 2. The raw data and a plot of the filtered data for each filter type is show in Figure A. The filter data alone for each filter type is shown in FIG. 6B without the data points. Input data is modeled with a low-pass first-order lag filter (shown as a thin line in FIG. 6B) having a time constant equal to 0.25 seconds. Input data is modeled with the Kalman filter (shown as a thick line in FIG. 6B). Comparison of these two lines with the data shows that standard low pass filter may handle noisy measurements but result in significant lag and imprecision respective to the Kalman filter in capturing the transient behavior of the system.

Figure 7A:
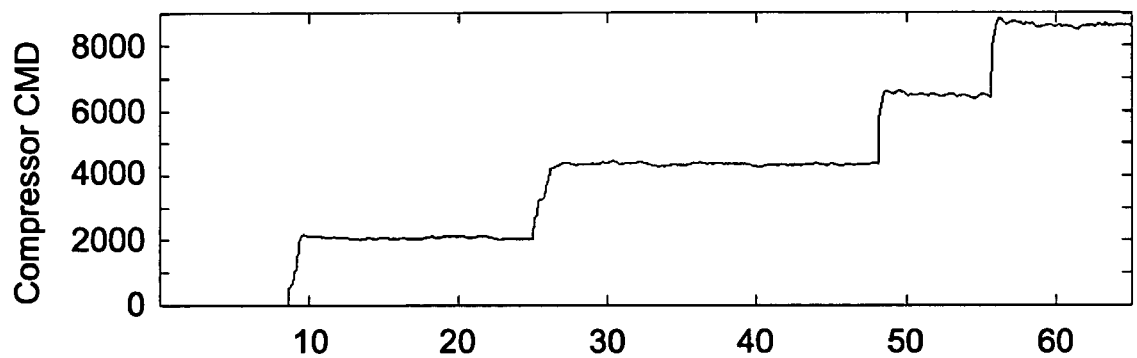
FIGS. 7A-7C are a set of graphs illustrating a compressor command signal and a mass flow signal generated using the KF-based signal processing of the present invention.
Figure 7B:
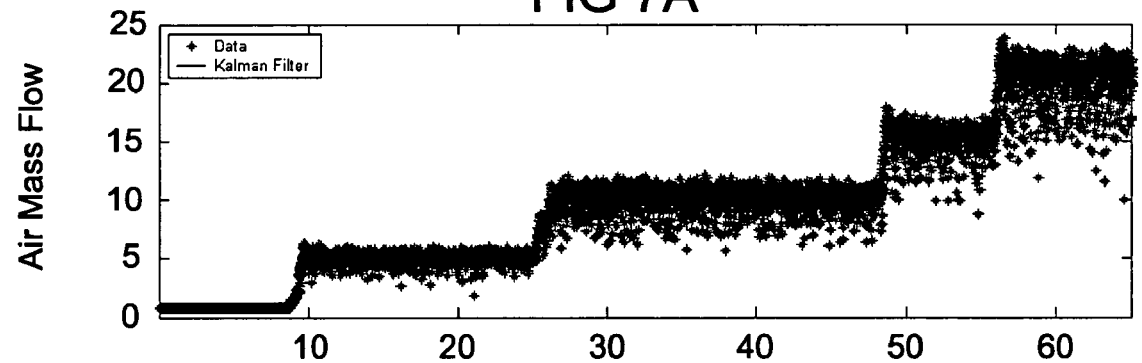
Figure 7C:
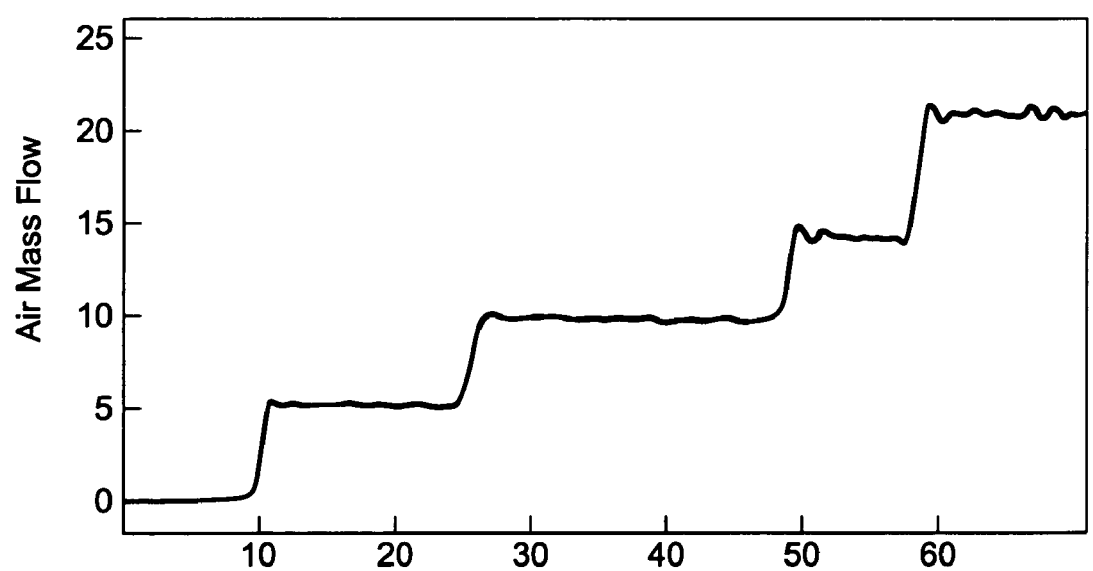

FIGS. 7A through 7C provide a comparison for the effectiveness of the performance across a broad range of operating conditions of the recursive Kalman filter derived according to the measurements of FIG. 2. FIG. 7A shows a step change in outputs from compressor 14 with FIG. 7B showing data from mass flow sensor 16 and the Kalman filter data overlayed. FIG. 7C shows only the Kalman filter data. A comparison of FIGS. 7B and 7C clearly illustrate that the recursive Kalman filter tracks the system output in the presence of heavy noise corruption of the signal from the mass flow sensor 16 to the controller 18.

Figure 8:
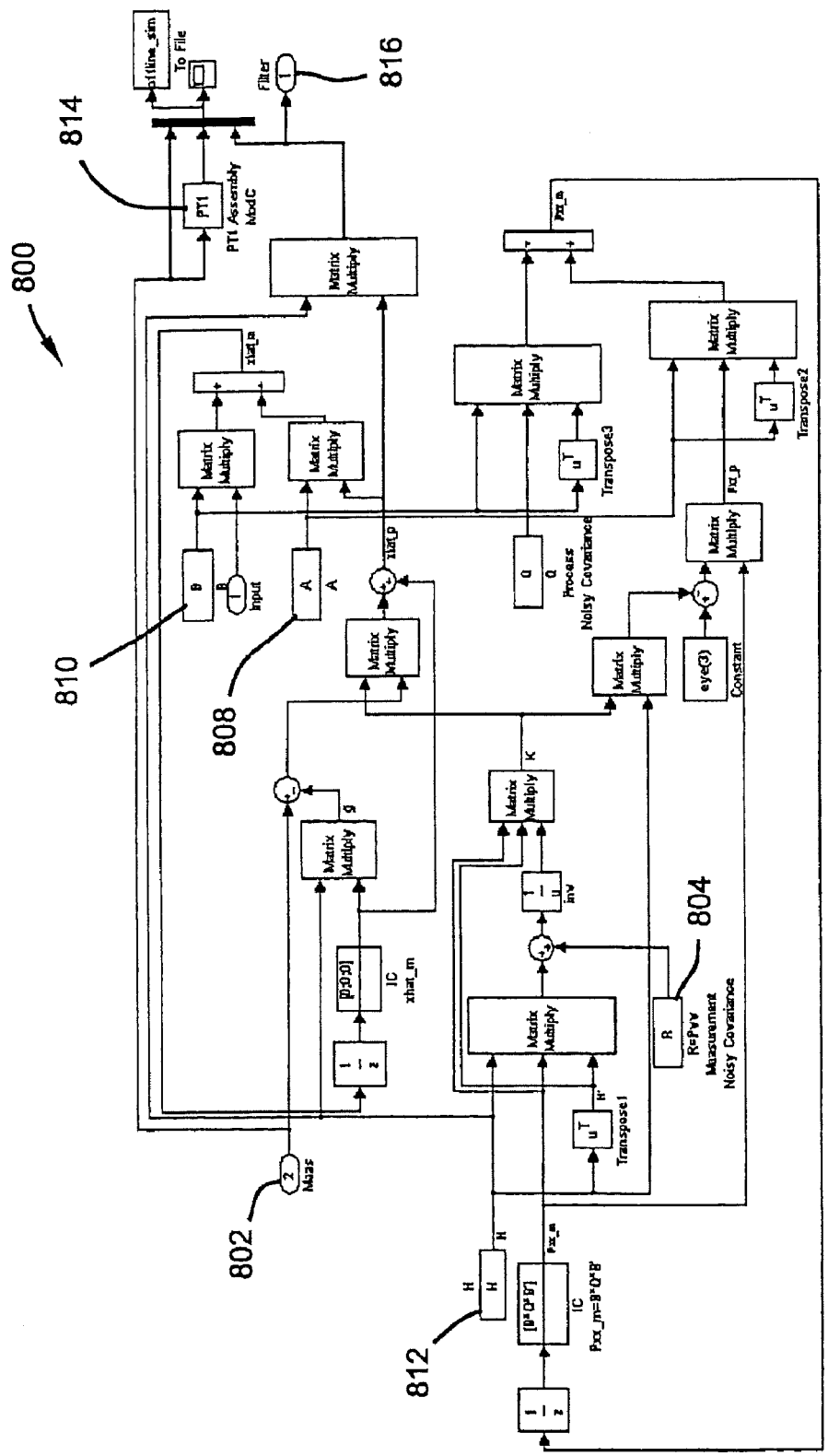
FIG. 8 is a software diagram for the implementation of a recursive Kalman filter in accordance with the present invention.

FIG. 8 provides a software diagram 800 (Simulink™ implementation) for the recursive Kalman filter (output at Black 816) derived according to the measurements of FIG. 2. This coding is compiled to real time controller code resident in controller 18 for enabling execution of the algorithm respective to the filter for measurements (Block 802) from the mass flow sensor 16. Common reference between diagram 800 and the equation set forth above is appreciated from the R Matrix (Block 804) of the measurement noise analysis and from the A, (Block 808), B, (Block 810), and H, (Block 812), matrices in the system identification portion of the algorithm. The remainder of the signal lines and mathematical operations represent a conversion of these equations into Simulink™ context with PT1 (Block 814) being the comparative low pass filter.

The described recursive Kalman filter accurately processes noisy measurement signals in a manner providing clear improvement over a conventional low pass filter. A number of benefits are derived from the above-described approach. Compact fuel cell system designs are conceptually enabled where mass flow sensors do not need several straight pipe diameters before the meter to "straighten the flow" reducing the effective turbulence. Similarly, the need for "honeycomb" flow straighteners at the inlet to the mass flow sensor has potentially been eliminated. Thus, low cost mass flow sensors are more viable than fuel cell systems insofar as the predictive estimation software (i.e., the recursive Kalman filter) accomodates turbulent flow without sacrifice transient response.

Compressor pulsation is also minimized as a smooth flow signal is provided to control the compressor. In the fuel cell stack, durability is beneficially augmented insofar as air flow pulsation is minimized along with comensurate reduction in cackled pressure pulsation. Anode pressure thereby more smoothly tracks cathode pressure to consistently provide a small pressure drop between the cathode (air) and the anode (hydrogen) gases across the PEM. Such consistent pressure drop management is vital to fuel cell stack performance and durability. Finally, transient performance is well managed with the rapid broad range response enabled by the predictive estimating filter.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of operating a fuel cell system comprising:
    monitoring an air mass flow rate from a compressor to a fuel cell stack with a flow meter;
    modeling said flow meter with a first mathematical formula;
    generating a measured signal from said flow meter;
    processing said first mathematical formula and said measured signal through a KF-based signal processing algorithm to provide a future signal estimate; and
    operating said compressor based on said future signal estimate.

2. The method of claim 1 wherein said first mathematical formula consists of a $3^{rd}$ order model of said flow meter.

3. The method of claim 1 further comprising predicting a current signal estimate based on a previously smoothed signal estimate.

4. The method of claim 3 wherein said previously smoothed signal estimate is determined based on a previously predicted estimate, a previous signal measurement and a previous gain.

5. The method of claim 3 further comprising calculating a smoothed current signal estimate based on a predicted current estimate, a current measurement and a gain.

6. The method of claim 5 wherein said future signal estimate is based on said smoothed current signal estimate.

7. The method of claim 6 wherein said future signal estimate is further based on a current command signal.

8. The method of claim 7 further comprising:
    modeling a compressor command signal with a second mathematical formula; and
    calculating said current command signal based on said second mathematical formula.

9. A method of operating a fuel cell system for catalytically reacting a feed stream in a fuel cell comprising:
    modeling a control element with a first mathematical formula to create a predictive estimation filter;
    operating a compressor to provide a feed stream to a fuel cell at a condition;
    monitoring said control element and generating a measurement signal of said feed stream based on said condition;
    converting said measurement signal into a smooth state signal through use of said predictive estimation filter; and
    regulating said compressor in response to said smooth state signal.

10. The method of claim 9 wherein said predictive estimation filter comprises a Kalman filter.

11. The method of claim 10 further comprising operating a control element to provide a reactant feed stream to said fuel cell at a flow rate.

12. The method of claim 10 further comprising operating said compressor to provide said reactant feed stream to said fuel cell at a flow rate.

* * * * *